(12) United States Patent
Kitazawa et al.

(10) Patent No.: US 12,421,064 B2
(45) Date of Patent: Sep. 23, 2025

(54) FEEDING DEVICE AND IMAGE FORMING APPARATUS

(71) Applicant: FUJIFILM Business Innovation Corp., Tokyo (JP)

(72) Inventors: Yoshiyuki Kitazawa, Kanagawa (JP); Kenta Ogata, Kanagawa (JP); Kouhei Yukawa, Kanagawa (JP); Masaru Okutsu, Kanagawa (JP); Hiroaki Fujikura, Kanagawa (JP); Yohei Onoue, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 187 days.

(21) Appl. No.: 18/177,770

(22) Filed: Mar. 3, 2023

(65) Prior Publication Data

US 2023/0303351 A1  Sep. 28, 2023

(30) Foreign Application Priority Data

Mar. 28, 2022  (JP) ................ 2022-052245

(51) Int. Cl.
| | |
|---|---|
| *B65H 7/06* | (2006.01) |
| *B65H 3/14* | (2006.01) |
| *B65H 3/48* | (2006.01) |
| *B65H 7/04* | (2006.01) |
| *B65H 7/16* | (2006.01) |
| *H04N 1/00* | (2006.01) |

(52) U.S. Cl.
CPC ............ *B65H 7/06* (2013.01); *B65H 3/14* (2013.01); *B65H 3/48* (2013.01); *B65H 7/04* (2013.01); *B65H 7/16* (2013.01); *H04N 1/00034* (2013.01); *H04N 1/00251* (2013.01); *H04N 1/00687* (2013.01); *B65H 2511/13* (2013.01); *B65H 2511/15* (2013.01); *B65H 2511/51* (2013.01); *B65H 2511/515* (2013.01); *B65H 2553/30* (2013.01); *B65H 2553/42* (2013.01)

(58) Field of Classification Search
CPC ... B65H 3/48; B65H 7/04; B65H 7/06; B65H 7/12; B65H 7/125; B65H 7/16; B65H 7/18; B65H 2511/13; B65H 2511/15; B65H 2511/51; B65H 2511/515; B65H 2553/30; B65H 2553/42; H04N 1/00034; H04N 1/00251; H04N 1/00687
See application file for complete search history.

(56) References Cited

U.S. PATENT DOCUMENTS

| | | | |
|---|---|---|---|
| 7,663,769 B2 * | 2/2010 | Hayashihara | G03G 15/5029 250/559.28 |
| 9,199,810 B2 | 12/2015 | Shimoyama et al. | |
| 2009/0086217 A1 * | 4/2009 | Hayashihara | G03G 15/6508 271/18 |

(Continued)

FOREIGN PATENT DOCUMENTS

JP  2015024868  2/2015

*Primary Examiner* — Prasad V Gokhale
(74) *Attorney, Agent, or Firm* — JCIPRNET

(57) ABSTRACT

A feeding device includes: a supply unit that supplies air to a space between a plurality of loaded media to float the media; a feeding unit that feeds out the media floated by the supply unit; and a detection unit that detects whether or not a medium bundle is present among the plurality of media in a state of being floated by the supply unit.

17 Claims, 9 Drawing Sheets

(56) References Cited

U.S. PATENT DOCUMENTS

| | | | |
|---|---|---|---|
| 2011/0233270 A1* | 9/2011 | Borton | B65H 3/48 271/97 |
| 2023/0312279 A1* | 10/2023 | Fujikura | B65H 3/0816 271/105 |
| 2024/0101374 A1* | 3/2024 | Araki | B65H 3/40 |
| 2024/0101376 A1* | 3/2024 | Araki | B65H 3/128 |

* cited by examiner

FEEDING DEVICE AND IMAGE FORMING APPARATUS

CROSS-REFERENCE TO RELATED APPLICATIONS

This application is based on and claims priority under 35 USC 119 from Japanese Patent Application No. 2022-052245 filed Mar. 28, 2022.

BACKGROUND

(i) Technical Field

The present invention relates to a feeding device and an image forming apparatus.

(ii) Related Art

JP 2015-24868 A discloses a sheet supply device including: a placing unit capable of placing a sheet bundle in which a plurality of sheets are loaded in an up-down direction; air blowing means that blows air onto the sheet bundle placed in the placing unit and floating at least an uppermost sheet; sucking/transporting means that is provided above the placing unit and sucks the uppermost sheet floated by the air blowing means to transport the sheet in a predetermined transport direction; a first light source that emits a strip-like first slit light having a component extending in the up-down direction, the first slit light intersecting at least a first edge of a first sheet and a second edge of a second sheet below the first sheet among the plurality of sheets floated; photographing means that photographs the first slit light irradiating the first sheet and the second sheet, and has, on a plane parallel to the first sheet and the second sheet, a photographing direction different from an irradiation direction of the first slit light by the first light source; calculation means that calculates an interval in the up-down direction between the first sheet and the second sheet; and air volume adjusting means that adjusts an air volume of the air blowing means on the basis of an interval in the up-down direction between the first sheet and the second sheet calculated by the calculation means.

In a feeding device including a supply unit that supplies air to a space between a plurality of loaded media to float the media, and a feeding unit that feeds media floated by the supply unit, in a case of calculating only an interval between the plurality of media in a state of being floated by the supply unit (hereinafter, sometimes referred to as a floating state), information on whether or not a medium bundle (i.e., a plurality of media present in a mutually overlapped state) is present in the plurality of media in the floating state. Therefore, since a condition related to feeding operation of the feeding unit cannot be set (changed) to a condition enabling suppression of multi-feeding of media on the basis of information, it is difficult to suppress multi-feeding of the media.

SUMMARY

Aspects of non-limiting embodiments of the present disclosure relate to a feeding device including a supply unit that supplies air to a space between a plurality of loaded media to float the media and a feeding unit that feeds the media floated by the supply unit, in which multi-feeding of the media is easily suppressed as compared with a case where only intervals between a plurality of media in a floating state are calculated.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a feeding device including a supply unit that supplies air to a space between a plurality of loaded media to float the media; a feeding unit that feeds out the media floated by the supply unit; and a detection unit that detects whether or not a medium bundle is present among the plurality of media in a state of being floated by the supply unit.

DETAILED DESCRIPTION

Hereinafter, an example of an embodiment according to the present invention will be described with reference to the drawings.

Image Forming Apparatus 10

Figure 1:
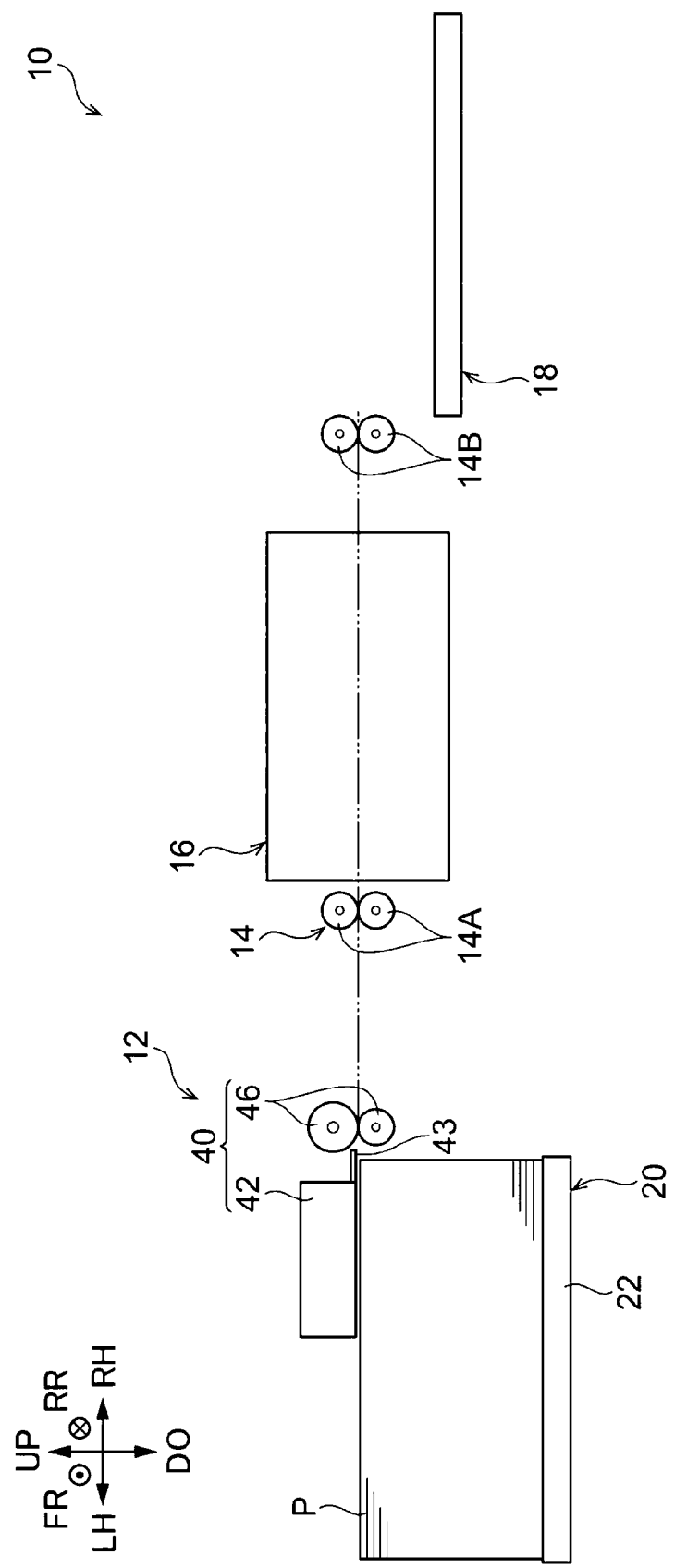
FIG. 1 is a schematic view illustrating an image forming apparatus according to the present embodiment.

A configuration of an image forming apparatus 10 according to the present embodiment will be first described. FIG. 1 is a schematic view illustrating the configuration of the image forming apparatus 10 according to the present embodiment.

An arrow UP shown in the drawings indicates an upper side of the apparatus (specifically, a vertically upper side), and an arrow DO indicates a lower side of the apparatus (specifically, a vertically lower side). Further, an arrow LH shown in the drawings indicates a left side of the apparatus, and an arrow RH indicates a right side of the apparatus. Further, an arrow FR shown in the drawings indicates a front side of the apparatus, and an arrow RR indicates a rear side of the apparatus. Since these directions are defined for convenience of description, the apparatus configuration is not limited to these directions. The term "apparatus" may be omitted in each direction of the apparatus. In other words, for example, "above the apparatus" may be simply referred to as "above".

In addition, in the following description, an "up-down direction" may be used to mean "both of an upper side and a lower side" or "one of the upper side and the lower side". A "right-left direction" may be used to mean "both of a right side and a left side" or "one of the right side and the left side". Note that the "right-left direction" can be also referred to as a side direction, a lateral direction, and a horizontal direction. A "front-rear direction" may be used to mean "both of a front side and a rear side" or "one of the front side and the rear side". Note that the "front-rear direction" can be also referred to as the side direction, the lateral direction, and the horizontal direction. Further, the up-down direction, the right-left direction, and the front-rear direction are directions intersecting each other (specifically, orthogonal directions).

In addition, a symbol with "x" described inside "○" in the drawings represents an arrow directing from a near side to a back side of a paper surface. In addition, a symbol with "." described inside "○" in the drawings represents an arrow directing from the back side to the near side on the paper surface.

The image forming apparatus 10 shown in FIG. 1 is an apparatus that forms an image on a recording medium P as an example of a medium. Specifically, as illustrated in FIG. 1, the image forming apparatus 10 includes a feeding device 12, a transport part 14, an image forming part 16, and an ejection part 18. Each part of the image forming apparatus 10 will be described below.

Transport Part 1

The transport part 14 illustrated in FIG. 1 is a constituent part that transports the recording medium P in the image forming apparatus 10. The transport part 14 has a function of transporting the recording medium P fed from the feeding device 12 to the image forming part 16 and a function of transporting the recording medium P on which an image has been formed by the image forming part 16 to the ejection part 18.

Specifically, the transport part 14 has transport members 14A and 14B each including a pair of transport rollers. In the transport part 14, the transport member 14A transports the recording medium P fed out from the feeding device 12 to the image forming part 16, and the transport member 14B transports the recording medium P on which an image has been formed by the image forming part 16 to the ejection part 18.

The transport members 14A and 14B are not limited to a pair of transport rollers. As the transport members 14A and 14B, for example, a transport member such as a transport belt or a transport drum may be used, and various transport members can be used.

Image Forming Part 16

The image forming part 16 illustrated in FIG. 1 is a constituent part that forms an image on the recording medium P fed from the feeding device 12. Examples of the image forming part 16 include an ink jet type image forming part that forms an image on a recording medium using ink and an electrophotographic image forming part that forms an image on a recording medium using toner.

An ink jet type image forming part forms an image on a recording medium by, for example, ejecting ink droplets to the recording medium from an ejection part. The ink jet image forming part may form an image on a recording medium by ejecting the ink droplets from the ejection part to a transfer body and transferring the ink droplets from the transfer body to the recording medium.

In an electrophotographic image forming part, for example, each step of charging, exposure, development, and transfer is performed to form an image on a recording medium. The electrophotographic image forming part may form an image on a recording medium by performing steps of charging, exposure, development, and transfer to form an image on a transfer body, and transferring the image from the transfer body to the recording medium.

Examples of the image forming part are not limited to the above-described ink jet image forming part and the above-described electrophotographic image forming part, and various image forming parts can be used.

Ejection Part 18

The ejection part 18 illustrated in FIG. 1 is a part of the image forming apparatus 10 to which a recording medium having an image formed thereon is ejected. After an image is formed by the image forming part 16, the recording medium P transported by the transport part 14 (specifically, the transport member 14B) is ejected to the ejection part 18.

Feeding Device 12

The feeding device 12 illustrated in FIG. 1, FIG. 2, FIG. 3, FIG. 4, and FIG. 5 feeds out the recording medium P. In the present embodiment, the feeding device 12 feeds the recording medium P in a predetermined feeding direction (specifically, rightward). Therefore, in the feeding device 12, the right side is downstream in the feeding direction, and the left side is upstream in the feeding direction. In the recording medium P fed from the feeding device 12, a downstream end portion in the feeding direction is referred to as a leading end portion, and an upstream end portion in the feeding direction is referred to as a trailing end portion. In addition, in the recording medium P, a direction intersecting the feeding direction (specifically, the front-rear direction) is referred to as a width direction, and an end portion in the width direction is referred to as a side end portion.

Figure 2:
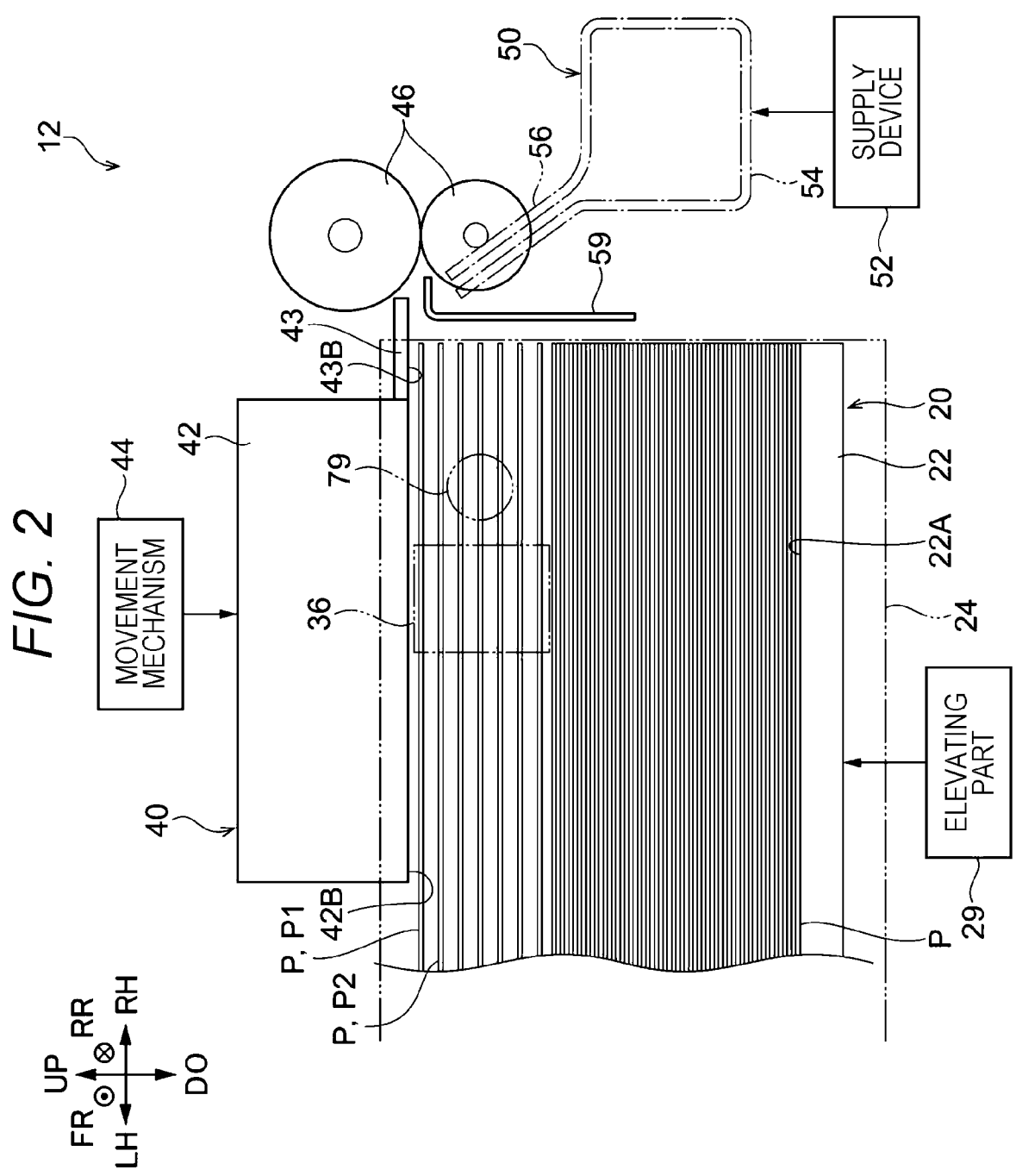
FIG. 2 is a schematic view illustrating a feeding device according to the present embodiment.
Figure 3:
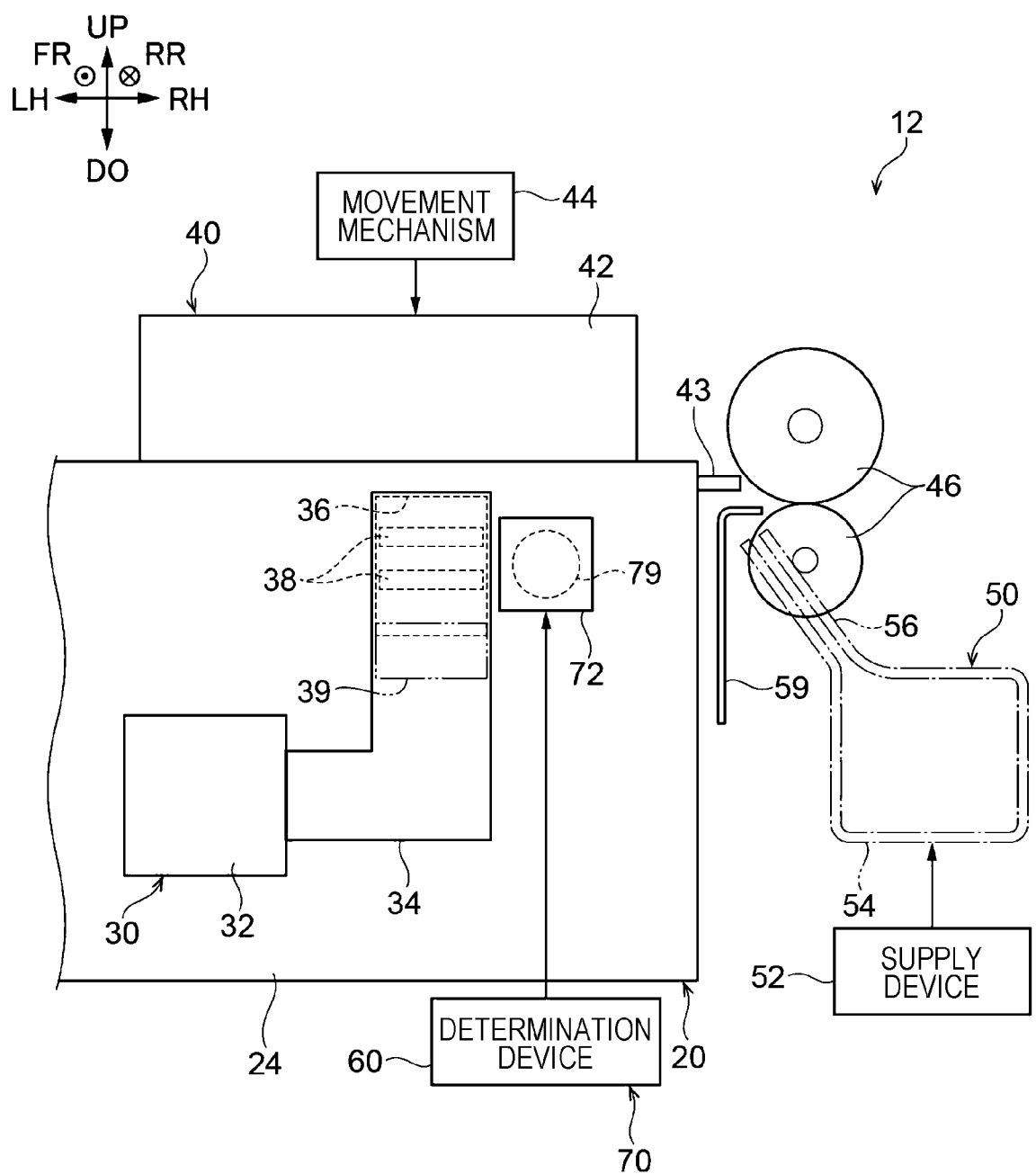
FIG. 3 is a view of the feeding device according to the present embodiment as viewed from an outer surface side of a side wall.

Specifically, as illustrated in FIG. 2 and FIG. 3, the feeding device 12 includes a housing unit 20, an elevating part 29 (refer to FIG. 2), a supply unit 30 (refer to FIG. 3), a feeding unit 40, a separation unit 50, a restriction part 59, and a detection unit 70 (refer to FIG. 3). Each part of the feeding device 12 will be described below.

Housing unit 20 and Elevating Part 29

The housing unit 20 is a constituent part that stores the recording medium P. Specifically, as shown in FIG. 2, the housing unit 20 has a loading part 22 and a pair of side walls 24. Illustrated in FIG. 2 is one side wall 24 (specifically, on the front side) of the pair of side walls 24.

The loading part 22 is a constituent part on which the recording medium P is loaded. Specifically, the loading part 22 forms a bottom portion of the housing unit 20 and is configured with a loading plate (so-called bottom plate) on which the recording medium P is loaded on an upper surface 22A.

The pair of side walls 24 are respectively disposed on of the front side and the rear side of the recording medium P loaded on the loading part 22. Each of the pair of side walls 24 is opposed to a corresponding one of the pair of side end portions of the recording medium P loaded on the loading part 22, and positions the recording medium P in the width direction (i.e., the front-rear direction).

The housing unit 20 includes a positioning unit (not illustrated) that positions the trailing end portion of the recording medium P loaded on the loading part 22. The housing unit 20 is not limited to the above-described configuration, and can adopt various configurations.

The elevating part 29 is a constituent part that raises and lowers the recording medium P housed in the housing unit 20. Specifically, the elevating part 29 raises the recording medium P so that an uppermost recording medium P is positioned at a predetermined height (hereinafter referred to as a feeding height) by raising the loading part 22, and lowers the recording medium P by lowering the loading part 22.

As the elevating part 29, for example, a raising member such as a wire or a push-up member such as an arm can be used. For example, the recording medium P is raised by raising the loading part 22 upward by the push-up member and the recording medium P is lowered by moving the loading part 22 downward by the raising member. For example, the recording medium P is raised by pushing up the loading part 22 upward from the lower side of the loading part 22 by the push-up member, and the recording medium P is lowered by moving the loading part 22 downward. The elevating part 29 is not limited to the above-described configuration, and various configurations may be employed. For example, the elevating part 29 may be configured to lower the recording medium P by using weights of the recording medium P and the loading part 22.

Supply Unit 30

Figure 4:
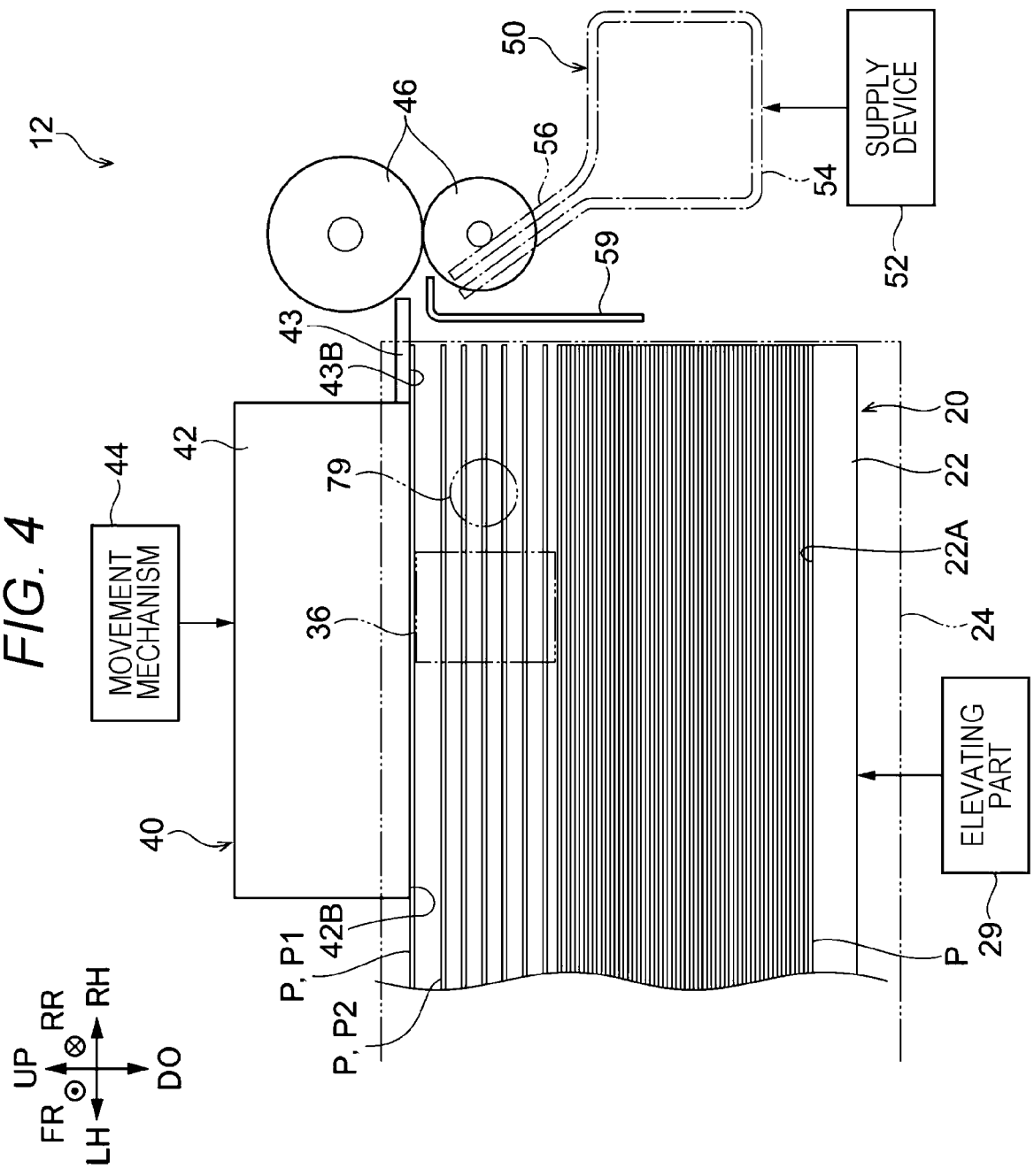
FIG. 4 is a schematic view illustrating a state in which a sucking body sucks an uppermost recording medium in the feeding device shown in FIG. 2.
Figure 5:
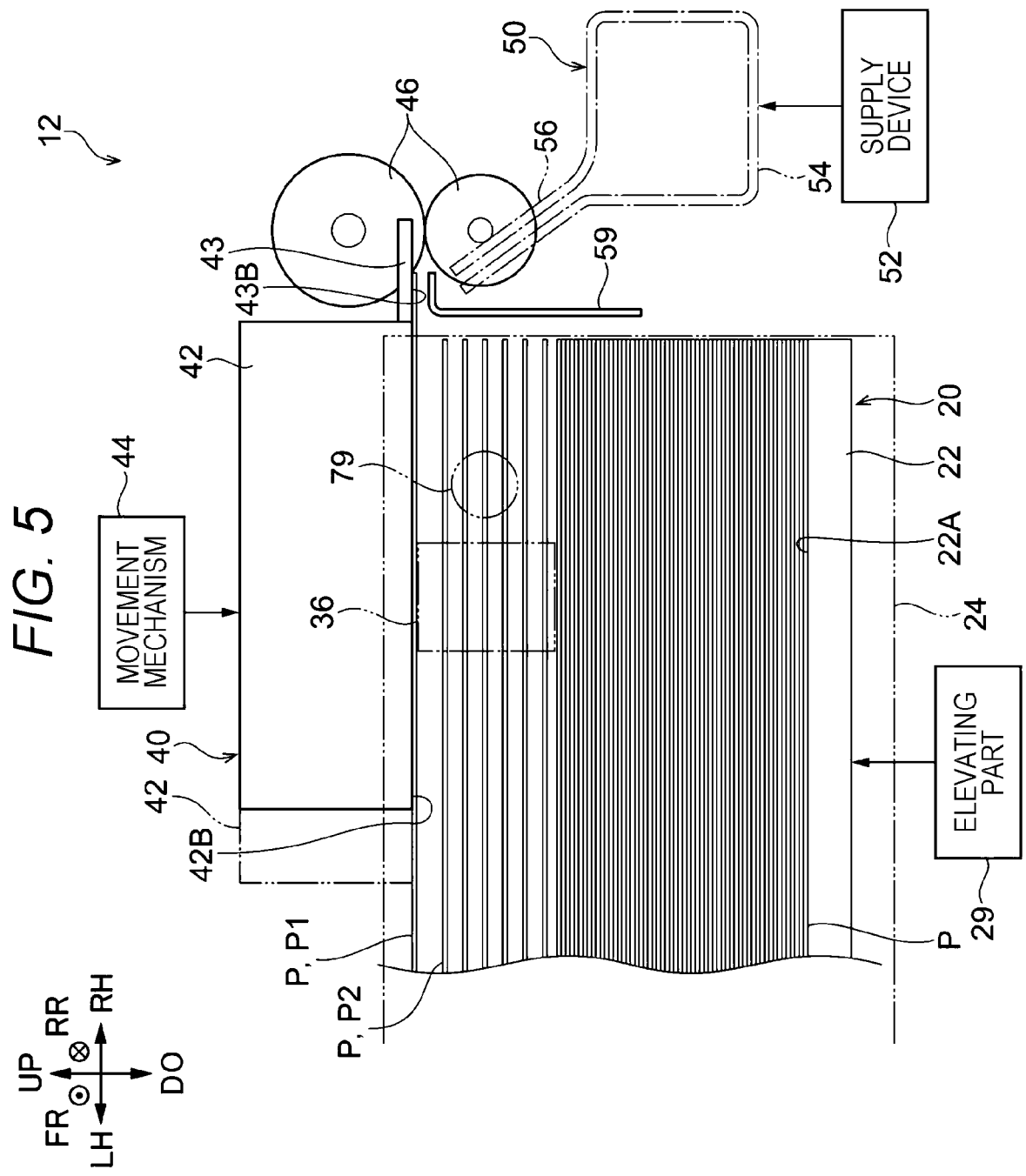
FIG. 5 is a schematic view illustrating a state in which the sucking body moves to a delivery position in the feeding device shown in FIG. 4.

The supply unit 30 illustrated in FIG. 3 is a constituent part that supplies air to a space between a plurality of loaded recording media P to cause the recording media P to float. The supply unit 30 supplies air to the plurality of recording media P positioned in a predetermined range including the uppermost recording medium P among the plurality of recording media P loaded on the loading part 22. Specifically, the supply unit 30 supplies air to the plurality of recording media P loaded on the loading part 22 in a range from the feeding height to a predetermined position below the feeding height. Here, the supply unit 30 supplies air to the space between the plurality of loaded recording media P to float the recording media P in order to separate the plurality of recording media P one by one and feed out the plurality of recording media P one by one by supplying air to the space between the plurality of recording media P. However, even when the supply unit 30 supplies air, the recording media P may not be separated from each other and may form a medium bundle. FIG. 2, FIG. 4, and FIG. 5 schematically show a state in which air is supplied to an upper part of the plurality of loaded recording media P to float the recording media P.

In the present embodiment, as shown in FIG. 3, the supply unit 30 includes a pair of blowing parts 32, a pair of flow pipes 34, and a pair of supply ports 36.

The pair of blowing parts 32 is a constituent part that sends wind (i.e., air). Each of the pair of blowing parts 32 is attached to an outer surface (i.e., a surface opposite to a surface opposed to the recording medium P loaded on the loading part 22) of each of the pair of side walls 24. As the blowing part 32, for example, a centrifugal blower that blows air in a centrifugal direction, such as a multi-blade blower (e.g., a sirocco fan), is used. As the blowing part 32, an axial blower that sends air in an axial direction or other blowers may be used.

Each of the pair of flow pipes 34 forms a passage through which air sent from each of the pair of blowing parts 32 flows. Each of the pair of flow pipes 34 has one end portion thereof connected to each of the pair of blowing parts 32, and the other end portion thereof connected to each of the pair of supply ports 36, respectively.

Each of the pair of supply ports 36 is a port for supplying air to the plurality of recording media P loaded on the loading part 22, and is formed in each of the pair of side walls 24, respectively. Each of the pair of supply ports 36 is opened, on the leading end portion side of the recording medium P loaded on the loading part 22, at an upper portion of the side wall 24.

The supply unit 30 supplies air to the space between the plurality of recording media P loaded on the loading part 22 from both the side end portions (i.e., the front side and the rear side) from the pair of blowing parts 32 through the pair of flow pipes 34 and the pair of supply ports 36.

A supply direction change part 38 is a constituent part that changes a supply direction of air to the space between the plurality of loaded recording media P. Specifically, the supply direction change part 38 is configured with, for example, a louver provided at the supply port 36 and having a plurality of blade plates. The supply direction change part 38 is capable of changing an air supply direction in at least one of the up-down direction and the right-left direction, for example. The supply direction change part 38 is not limited to a louver, and other changing means may be used.

A supply region change part 39 is a constituent part that changes a region of air supply to the space between the plurality of loaded recording media P. Specifically, the supply region change part 39 is configured with, for example, an opening/closing plate (i.e., a shutter) that is movably provided at the supply port 36 and capable of changing at least one of an opening position and an opening area of the supply port 36 by movement. The supply region change part 39 can change an air supply region in at least one of the up-down direction and the right-left direction, for example. The supply region change part 39 is not limited to an opening/closing plate, and other change part may be used.

Although the supply unit 30 supplies air to the space between the recording media P loaded on the loading part 22 from both side end portions (i.e., from the front side and the rear side), the present invention is not limited thereto. The supply unit 30 may be configured to supply air from one side (i.e., one of the front side and the rear side) of both the side end portions to the space between the plurality of loaded recording media P. In addition, the supply unit 30 may be configured to supply air from at least one side of the leading end portion and the trailing end portion of the recording medium P instead of or in addition to supplying air from at least one of both the side end portion sides of the recording medium P to the space between the plurality of loaded recording media P. Therefore, the supply unit 30 can be configured to supply air to the space between the plurality of recording media P loaded on the loading part 22 from at least one side of both the side end portions, the leading end portion, and the trailing end portion.

Feeding Unit 40

The feeding unit 40 illustrated in FIG. 2, FIG. 4, and FIG. 5 is a constituent part that feeds out the recording medium P floated by the supply unit 30. Specifically, as illustrated in FIG. 4, the feeding unit 40 sucks the uppermost recording medium P (hereinafter referred to as an uppermost medium P1) among the recording media P that have been floated by the supply unit 30, and feeds the uppermost recording medium P downstream in the feeding direction (specifically, rightward) as illustrated in FIG. 5. More specifically, as illustrated in FIG. 4 and FIG. 5, the feeding unit 40 includes a sucking body 42, a movement mechanism 44, and a pair of feeding-out rollers 46.

The sucking body 42 is a component that causes a lower surface 42B to suck the uppermost medium P1 by suction. Specifically, the sucking body 42 sucks the uppermost medium P1 at a position closer to a trailing end portion than to a leading end portion of the uppermost medium P1 positioned at the feeding height. The sucking body 42 has formed an overhanging part 43 that overhangs downstream (specifically, rightward) in the feeding direction. By sucking the uppermost medium P1 to the lower surface 42B of the sucking body 42, the leading end portion of the uppermost medium P1 is pressed against a lower surface 43B of the overhanging part 43.

The movement mechanism 44 is a mechanism that moves the sucking body 42 in the right-left direction (i.e., a downstream direction and an upstream direction in the feeding direction) between a suction position (a position shown in FIG. 2 and a position shown by a chain double-dashed line in FIG. 5) and a delivery position (a position shown by a solid line in FIG. 5).

Specifically, the movement mechanism 44 is configured with known mechanisms such as a motor, a gear, a rack, a pinion, and a belt drive. The movement mechanism 44 is not limited to a specific mechanism, and various configurations may be used.

The pair of feeding-out rollers 46 is a feeding member that feeds the recording medium P toward the image forming part 16. The pair of feeding-out rollers 46 is disposed on the downstream side of the sucking body 42 in the feeding direction (specifically, at the above-described delivery position) so as to be in contact with each other in the up-down direction. The feeding member is not limited to the pair of feeding-out rollers 46. As the feeding member, for example, feeding members such as an annular belt and a drum may be used, and various feeding members can be used.

In the feeding unit 40, the sucking body 42 causes the lower surface 42B to suck the uppermost medium P1 by suction at the suction position (the position shown in FIG. 2), and the sucking body 42 is moved to the delivery position (the position shown by the solid line in FIG. 5) by the movement mechanism 44. Then, at the delivery position, the recording medium P is delivered from the sucking body 42 to the pair of feeding-out rollers 46, and the pair of feeding-out rollers 46 feeds the recording medium P toward the image forming part 16.

The feeding unit 40 is not limited to the above configuration. For example, the feeding unit 40 may have a configuration in which feeding members such as a belt and a roller are used instead of the sucking body 42. In a configuration using an annular belt, for example, the belt can be configured to have, on an inner periphery thereof, a suction part that sucks the recording medium P to an outer peripheral surface of the belt by suction.

Separation Unit 50 and Restriction Part 59

The separation unit 50 illustrated in FIG. 4 is a constituent part that supplies air to a recording medium P (hereinafter, referred to as a next medium P2) disposed immediately below the uppermost medium P1 sucked by the sucking body 42 to separate the uppermost medium P1 from the next medium P2. Specifically, the separation unit 50 supplies air to a space between the uppermost medium P1 sucked by the sucking body 42 and the next medium P2 to separate the uppermost medium P1 from the next medium P2. The next medium P2 is the recording medium P that is fed out next to the uppermost medium P1, and is the recording medium P that is disposed below and adjacent to the uppermost medium P1. More specifically, as shown in FIG. 4, the separation unit 50 includes, for example, a supply device 52, a flow pipe 54, and a nozzle 56.

The supply device 52 is a device that supplies air to the flow pipe 54. Specifically, as the supply device 52, for example, a multi-blade blower(e.g., a sirocco fan) that supplies air to the flow pipe 54, a valve mechanism that blocks and releases air, and the like are used. The supply device 52 is not limited to a multi-blade blower (e.g., a sirocco fan) and a valve mechanism for blocking and opening air, and other supply devices such as an air compressor may be used.

The flow pipe 54 forms a passage through which air sent from the supply device 52 flows. The flow pipe 54 extends along the width direction (i.e., the front-rear direction) of the recording medium P, and allows air to flow along the width direction.

A plurality of nozzles 56 is provided along the width direction (i.e., the front-rear direction) of the recording medium P with respect to the flow pipe 54. Each of the plurality of nozzles 56 extends from the flow pipe 54 to the sucking body 42 (i.e., the overhanging part 43) side (i.e., an obliquely upper left side).

In the separation unit 50, air is ejected from the nozzle 56 toward the overhanging part 43 in a state in which the sucking body 42 is positioned at the suction position (the position illustrated in FIG. 2). The air hitting the overhanging part 43 is supplied to the space between the uppermost medium P1 and the next medium P2. As a result, the uppermost media P1 and the next media P2 are separated, and the next media P2 falls.

In this manner, since the air from the nozzle 56 is supplied to the space between the uppermost medium P1 and the next medium P2 via the overhanging part 43, the overhanging part 43 may be considered as one element of the separation unit 50. The separation unit 50 may be configured to directly supply air to the space between the uppermost media P1 and the next media P2 without passing through the overhanging part 43.

The restriction part 59 illustrated in FIG. 4 is a constituent part that restricts movement of the next medium P2 to the downstream side in the feeding direction. Specifically, the restriction part 59 is configured by a restriction wall disposed between the housing unit 20 and the pair of feeding-out rollers 46 (specifically, the feeding-out roller 46 disposed on the lower side) in a side view. The restriction part 59 is formed in a shape of a plate extending in the up-down direction in side view.

Upon movement of the sucking body 42 to the delivery position, the restriction part 59 comes into contact with the leading end portion of the next medium P2 that is fed to the downstream side in the feeding direction together with the uppermost medium P1 to cause the next medium P2 to fall from the uppermost medium P1, and restricts movement of the next medium P2 to the downstream side in the feeding direction. In other words, the restriction part 59 suppresses multi-feeding of the medium P2. The restriction part 59 is not limited to the above configuration, and other restriction means may be used.

Detection Unit 70

The detection unit 70 illustrated in FIG. 3 is a constituent part that detects whether or not a medium bundle is present among the plurality of recording media P in a state of being floated by the supply unit 30 (hereinafter, may be referred to as a floating state). Specifically, as shown in FIG. 3, the detection unit 70 includes a photographing part 72 and a decision device 60.

The photographing part 72 is a constituent part that captures images of the plurality of recording media P in the floating state. Specifically, the photographing part 72 is configured with, for example, a camera having an optical element such as a lens and an image pickup element such as a complementary metal oxide semiconductor (CMOS) image sensor. The photographing part 72 is not limited to the camera, and may be a camera using a charge coupled device (CCD) or other element as an image pickup element, or other photographing parts may be used.

Figure 6:
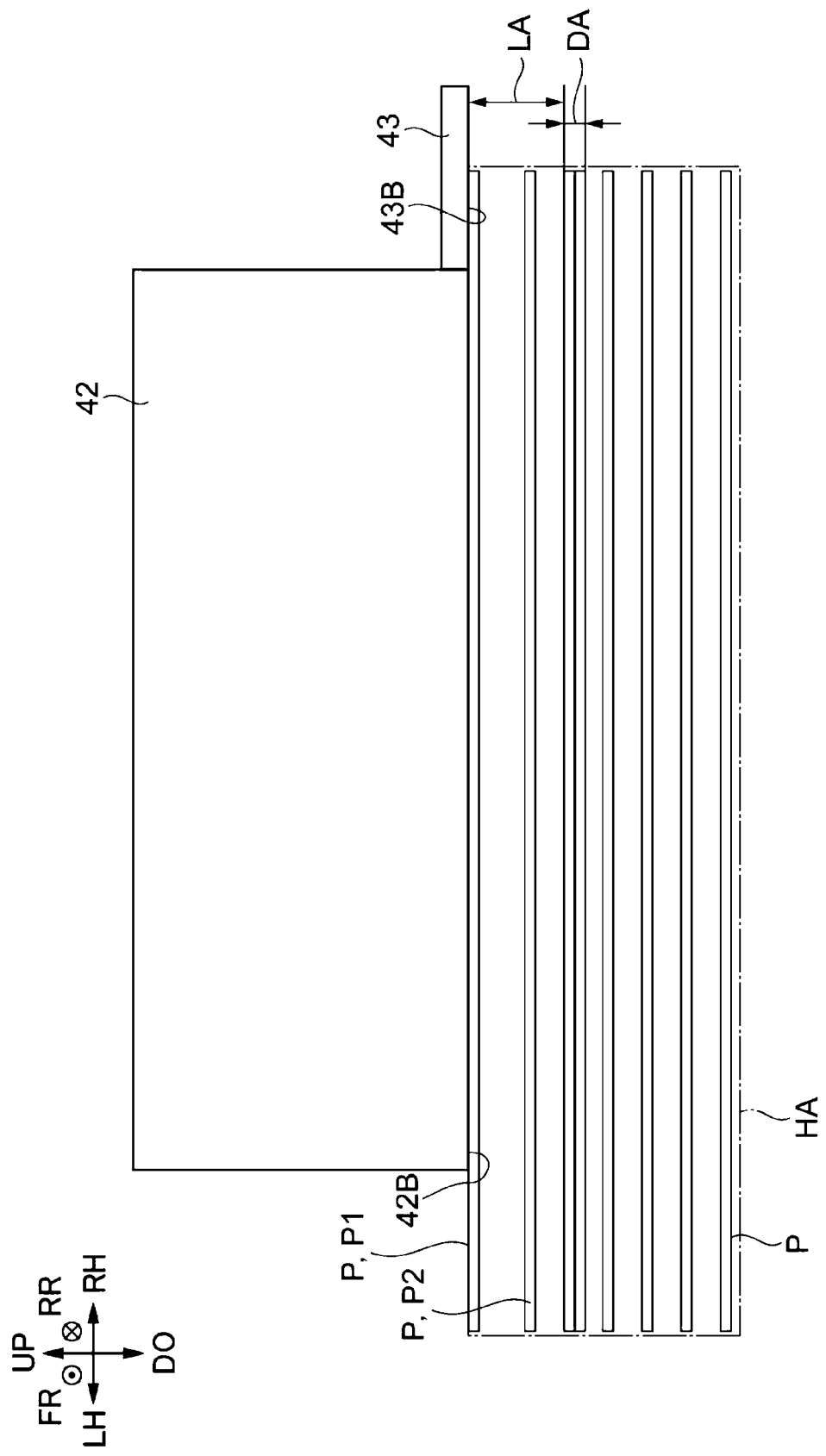
FIG. 6 is a schematic view illustrating a photographing range of a photographing part according to the present embodiment.

The photographing part 72 is attached to the outer surface of one of the pair of side walls 24 (e.g., the side wall 24 on the front side). The photographing part 72 captures images of a plurality of recording media P in the floating state from one side (specifically, the front side) in the width direction through an opening 79 formed in the side wall 24. As illustrated in FIG. 6, the photographing part 72 has a photographing range (specifically, a chain line HA in FIG. 6) in which images of the leading end portions of the plurality of recording media P in the floating state are captured.

The photographing range of the photographing part 72 is a range in which images of all the recording media P in the floating state among the plurality of recording media P loaded on the loading part 22 can be captured. In other words, the photographing range of the photographing part 72 is considered a supply range of air of the supply unit 30 to the plurality of recording media P loaded on the loading part 22. While feeding operation of the recording medium P by the feeding unit 40 is continued, the photographing part 72 continues photographing operation in the photographing range. The photographing part 72 continuously photographs an image of the recording medium P a plurality of times.

The photographing part 72 includes an illumination unit (not illustrated) that illuminates a photographing range. Although the photographing part 72 captures images of the plurality of recording media P in the floating state from one side (specifically, the front side) in the width direction in the present embodiment, the photographing part is not limited thereto. The photographing part 72 may be configured to capture images of the plurality of recording media P in the floating state from the other side (specifically, the rear side) in the width direction. In addition, the photographing part 72 may be configured to capture images of the plurality of recording media P in the floating state from the downstream side (specifically, the right side) or the upstream side (specifically, the left side) in the feeding direction.

Figure 7:
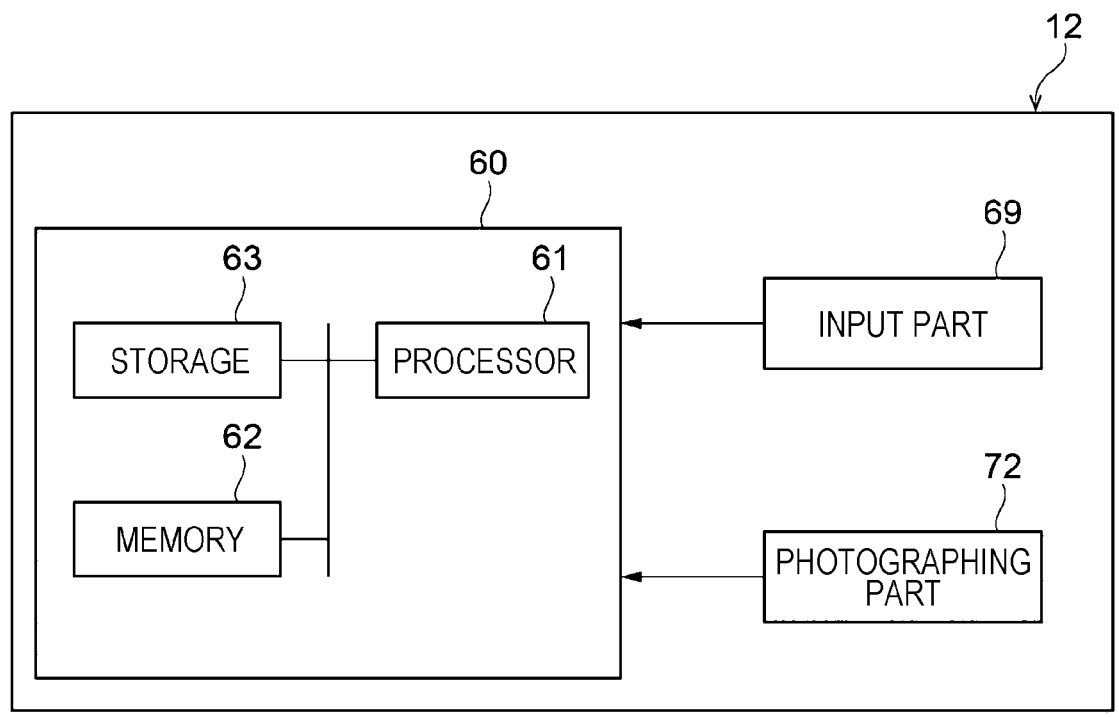
FIG. 7 is a block diagram illustrating an example of a decision device in the feeding device according to the present embodiment.

The decision device 60 shown in FIG. 3 and FIG. 7 is a device that makes various determinations (including decision) in the feeding device 12. Specifically, as illustrated in FIG. 7, the decision device 60 includes a processor 61, a memory 62, and a storage 63.

As the processor 61, for example, a central processing unit (CPU) that is a general-purpose processor is used. The storage 63 stores various programs including an execution program 63A (refer to FIG. 8), and various data. Specifically, the storage 63 is realized by a recording device such as a hard disk drive (HDD), a solid state drive (SSD), and a flash memory.

The memory 62 is a work area for the processor 61 to execute various programs, and temporarily records various programs or various data when the processor 61 executes processing. The processor 61 reads various programs including the execution program 63A from the storage 63 to the memory 62, and executes the programs using the memory 62 as the work area.

Figure 8:
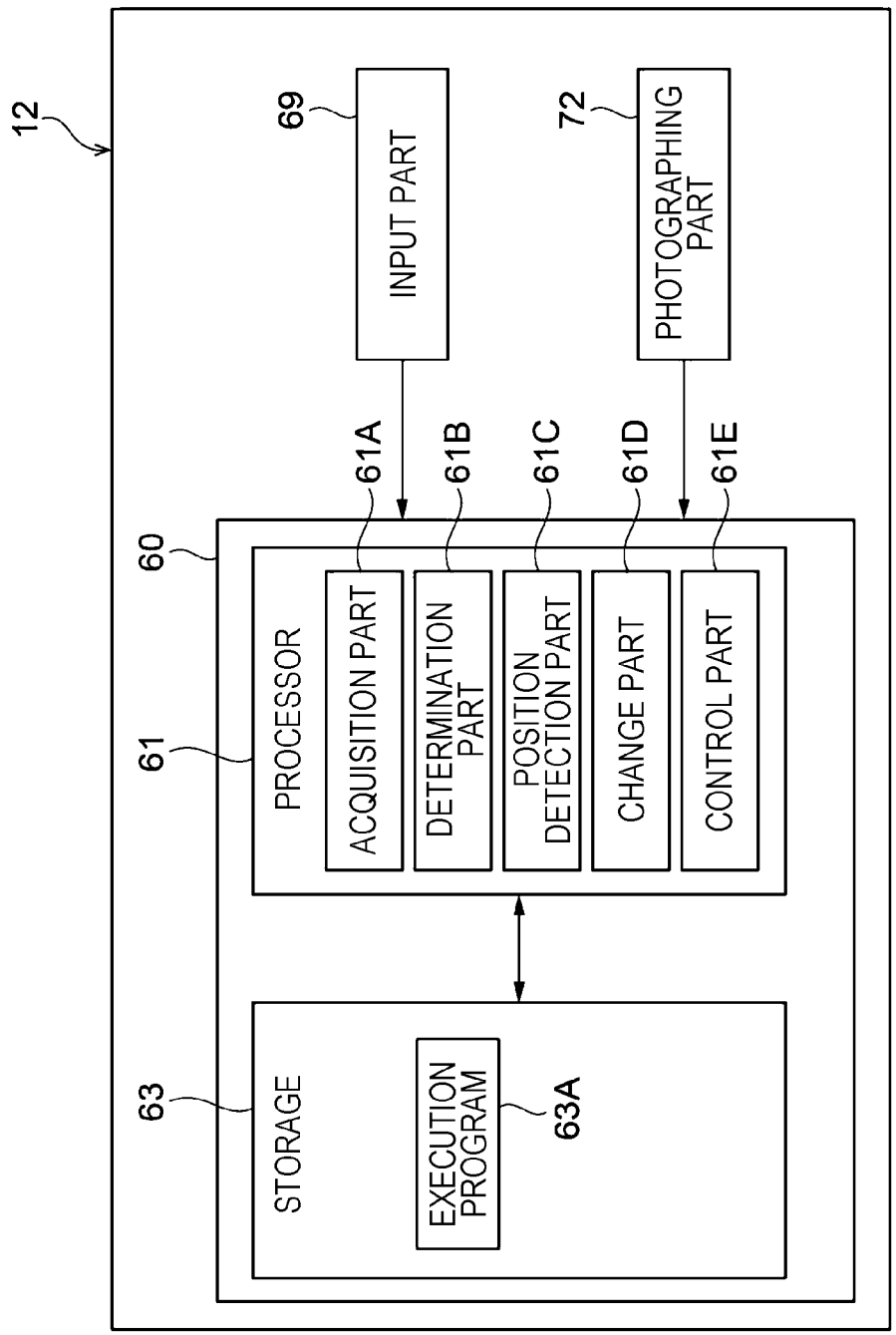
FIG. 8 is a block diagram illustrating an example of a functional configuration of a processor of the decision device in the feeding device according to the present embodiment.

In the decision device 60, the processor 61 realizes various functions by executing the execution program 63A. Hereinafter, a functional configuration realized by cooperation between the processor 61 as a hardware resource and the execution program 63A as a software resource will be described. FIG. 8 is a block diagram illustrating a functional configuration of the processor 61.

As illustrated in FIG. 8, in the decision device 60, the processor 61 executes the execution program 63A to function as an acquisition part 61A, a determination part 61B, a position detection part 61C, a change part 61D, and a control part 61E.

The acquisition part 61A acquires thickness information per unit number of the recording media P associated with input information input by a user.

Examples of the input information include information on a type (including brand) of the recording medium P. The thickness information per unit number of the recording media P associated with the input information is stored in advance in the storage 63. Specifically, for example, information on a thickness per recording medium P of each type is stored in the storage 63 in advance.

The input information is information input by a user through an input part 69 such as an operation panel. Therefore, for example, when the user inputs a type of the recording medium P to be used for image formation through the input part 69, the acquisition part 61A acquires information on the thicknesses per sheet (an example of the unit number) associated with the type.

The acquisition part 61A may acquire thickness information per unit number of the recording media P input by the user. For example, when the user inputs a thicknesses per recording medium P (an example of the unit number) to be used for image formation through the input part 69, the acquisition part 61A acquires information on the thicknesses. As described above, the acquisition part 61A directly or indirectly acquires the thickness information per unit number of the recording media P by input by the user. The thickness information per unit number of the recording media P may be thickness information per the plurality of recording media P. A set value of a magnification to be set which will be described later is changed depending on whether a unit number is one or plural.

The determination part 61B determines whether a medium bundle is present or not on the basis of the thickness information per unit number of the recording media P and a thickness of an image (see a dimension DA in FIG. 6) captured by the photographing part 72. Specifically, the determination part 61B determines whether a medium bundle is present or not using the thickness information per unit number of the recording media P acquired by the acquisition part 61A. In this manner, the detection unit 70 detects whether a medium bundle is present or not among the plurality of recording media P in the floating state.

It is preferable that the determination part 61B makes the determination on the basis of a thickness of images of the plurality of recording media P captured in a state of being floated by the supply unit 30, in which state air supply by the separation unit 50 is stopped. This is for allowing the determination part 61B to make the determination on the basis of an image of the recording medium P that is not being affected by the air supply by the separation unit 50.

Here, the medium bundle represents a plurality of sheets of the recording media P existing in an overlapped state. In the present embodiment, the plurality of recording media P in the floating state is referred to as a "medium bundle". The determination part 61B extracts, as an image of the recording medium P, a part having a feature(e.g., color including brightness and darkness) as an image of the recording medium P from among photographed images captured by the photographing part 72.

Specifically, the determination part 61B determines that a medium bundle is present when the thickness of the image (see the dimension DA in FIG. 6) is greater than or equal to a threshold value obtained by multiplying, by a predetermined magnification, a thickness indicated by the thickness information acquired by the acquisition part 61A. This magnification is different for each thickness of the loaded recording media P, for example. Specifically, for each thickness of the recording medium P used in image formation, the determination part 61B changes the magnification to be used. The thickness is based on a thickness of the thickness information acquired by the acquisition part 61A.

Specifically, the determination part 61B uses a first magnification(e.g., 1.5 times) as the magnification when the loaded recording media P have a first thickness, and uses a second magnification (e.g., 2) higher than the first magnification as the magnification when the loaded recording media P have a second thickness smaller than the first thickness. In a case where the acquisition part 61A acquires the thickness information per one sheet of the recording medium P, the first magnification is, for example, a magnification which is more than 1 and less than 2, or is 2 or less. The present invention is not limited to the case where the first magnification is 1.5 and the second magnification is 2, and the second magnification may be a magnification higher than the first magnification.

Note that setting of the threshold value including the magnification may be changed by a user through the input part 69.

The determination part 61B changes the number of times of determination per unit time on the basis of a type of the recording medium P. Specifically, when the recording media P have the first thickness, the determination part 61B determines whether or not a medium bundle is present at a first number of times of determination predetermined per unit time (e.g., 30 times per second), and when the recording media P have the second thickness smaller than the first thickness, the determination part determines whether or not a medium bundle is present at a second number of times of determination per unit time (e.g., 60 times per second) that is larger than the first number of times of determination. Note that the first number of times of determination is not limited to 30 times per second and the second number of times of determination is not limited to 60 times per second.

The second number of times of determination need only be the number of times larger than the first number of times of determination.

Note that the above-described number of times of determination may be changed through the input part 69.

The position detection part 61C detects a position of a medium bundle when the medium bundle is present. Specifically, when the determination part 61B determines that the medium bundle is present, the position detection part 61C detects, as the position of the medium bundle, a distance LA (refer to FIG. 6) between a position where the feeding unit 40 comes into contact with the recording medium P (specifically, the lower surface 42B of the sucking body 42) and the medium bundle.

In the case where the medium bundle is present, the position detection part 61C continuously detects a position of the medium bundle. In other words, in the case where the determination part 61B determines that a medium bundle is present, a position of the medium bundle is continuously detected. When a bundling state of the medium bundle is cancelled, the determination part 61B determines that no medium bundle of the recording media P is present thereafter. When identifying the position of the recording medium P, for example, on the basis of an amount of upward movement of the recording medium P to have no medium bundle present at the identified position, the determination part 61B determines that the bundling state of the medium bundle has been canceled. The determination part 61B may identify the position of the recording medium P by the number of sheets from the uppermost recording medium P1.

The change part 61D changes conditions related to the feeding operation of the feeding unit 40 on the basis of information on whether the medium bundle is present or not determined by the determination part 61B. The conditions include an air volume, temperature, humidity, a supply direction, and a supply region of air to be supplied to the space between the recording media P in the supply unit 30. The conditions include an air volume, temperature, humidity, a supply direction, and a supply region of the air to be supplied to the next medium P2 in the separation unit 50. In addition, the conditions include a position of the restriction part 59 in the up-down direction. The condition further include a feeding height by the elevating part 29. The conditions also include a distance by which the sucking body 42 feeds the recording medium, i.e., the suction position (the position shown in FIG. 2) and the delivery position (the position shown by the solid line in FIG. 5) of the sucking body 42.

The control part 61E controls operation of each part of the feeding device 12 on the basis of the condition changed by the change part 61D. As described above, since the decision device 60 has a function of controlling the operation of each part of the feeding device 12, it can be said that the determination device 60 is a control device.

In the present embodiment, among the functional parts of the acquisition part 61A, the determination part 61B, the position detection part 61C, the change part 61D, and the control part 61E, a functional part of the detection unit 70 is configured by the acquisition part 61A, the determination part 61B, and the position detection part 61C. In addition, for example, the change part 61D and the control part 61E may be configured by a device separate from the decision device 60. Furthermore, each of the acquisition part 61A, the determination part 61B, the position detection part 61C, the change part 61D, and the control part 61E may be configured as a different device.

The detection unit 70 is not limited to the configuration described above. For example, instead of the photographing part 72, the detection unit 70 may be configured to include an irradiation part that irradiates the plurality of recording media P in the floating state with strip-shaped light extending in the up-down direction, and a light reception part that receives light, and to detect whether a medium bundle is present or not on the basis of a thickness (i.e., a dimension in the up-down direction) of a part where the light is blocked by the recording media P. Further, in the configuration including the irradiation part and the light reception part, it may be detected whether the medium bundle is present or not on the basis of a thickness of a part where the light is reflected or absorbed by the recording medium P. As the irradiation part, for example, it is possible to use a light emitting part in which light emitting elements are arranged in rows or in a staggered manner along the up-down direction, or are arranged in a two dimensional manner. As the light reception part, for example, it is possible to use a light reception part in which light receiving elements are arranged in rows or in a staggered manner along the up-down direction, or are arranged in a two dimensional manner.

Effect according to the Present Embodiment

Effects of the present embodiment will now be described.

In the present embodiment, the detection unit 70 detects whether or not a medium bundle is present among the plurality of recording media P in the floating state. Therefore, information on whether or not a medium bundle is present among the plurality of recording media P in the floating state is obtained.

Here, in a case where only an interval between the plurality of recording media P in the floating state is calculated (hereinafter, referred to as a mode A), information on whether or not a medium bundle is present among the plurality of recording media P in the floating state is not obtained. Therefore, since the conditions related to the feeding operation of the feeding unit 40 cannot be set (including changes) to conditions under which multi-feeding of media can be suppressed, multi-feeding of recording media P can be hardly suppressed.

On the other hand, in the present embodiment, since it is possible to set the conditions related to the feeding operation of the feeding unit 40 on the basis of presence or absence of a medium bundle, it is easy to set a condition related to the feeding operation of the feeding unit 40 to a condition enabling suppression of the multi-feeding. As a result, according to the feeding device 12 of the present embodiment, it is easy to suppress multi-feeding of the recording media P as compared with the mode A.

Therefore, in the image forming apparatus 10, an image can be formed on the recording medium P while suppressing multi-feeding of the recording media P as compared with the case where only the interval between the plurality of recording media P in the floating state is calculated.

Specifically, in the present embodiment, the determination part 61B determines whether a medium bundle is present or not on the basis of the thickness information per unit number of the recording media P and a thickness of an image (see the dimension DA in FIG. 6) captured by the photographing part 72.

Here, in a case of determining whether or not a medium bundle is present on the basis of only an image captured by the photographing part 72 (hereinafter, referred to as a mode B), the determination part 61B determines whether or not a medium bundle is present using only information obtained from the image captured by the photographing part 72 in a state in which a thickness per unit number of the recording media P is unknown, and thus erroneous determination may occur.

On the other hand, in the present embodiment, as described above, the determination part 61B determines whether or not a media bundle is present on the basis of the thicknesses information per unit number of the recording media P and the thicknesses of the image captured by the photographing part 72, and thus erroneous determination is suppressed as compared with the mode B.

In the present embodiment, the acquisition part 61A acquires the thickness information per unit number of the recording media P associated with the input information input by the user, or the thickness information per unit number of the recording media P input by the user. The determination part 61B determines whether the medium bundle is present or not using the thickness information per unit number of the recording media P acquired by the acquisition part 61A. Therefore, as compared with a case where a thickness measured by a measurement unit provided in the feeding device 12 is used as the thickness information, since the measurement unit is not necessary, the configuration of the feeding device 12 is simplified.

In addition, in the present embodiment, specifically, the determination part 61B determines that a medium bundle is present when the thickness of the image (see the dimension DA in FIG. 6) is greater than or equal to the threshold value obtained by multiplying, by a predetermined magnification, the thickness indicated by the thickness information acquired by the acquisition part 61A. This magnification is different for each thickness of the loaded recording medium P.

Therefore, as compared with a case where a magnification used is constant regardless of a thickness of the recording medium P, variation in determination accuracy due to a difference in a thickness of the recording medium P is suppressed.

Specifically, in the present embodiment, the determination part 61B uses the first magnification (e.g., 1.5) as the magnification when the loaded recording media P have the first thickness, and uses the second magnification (e.g., 2) higher than the first magnification as the magnification when the loaded recording media P have the second thickness smaller than the first thickness.

Here, in the case where the thickness of the recording media P is the second thickness smaller than the first thickness, since an attitude of the recording medium P is easily changed by being inclined or waved due to supply of air from the supply unit 30 as compared with the case where the thickness of the recording media P is the first thickness, an image having a thickness larger than an actual thickness may be obtained. Therefore, in a case where the first magnification is used when the thickness of the recording media P is the second thickness (hereinafter, referred to as a mode C), erroneous determination may occur.

By contrast, in the present embodiment, as described above, in the case where the thickness of the loaded recording media P is the second thickness that is smaller than the first thickness, the determination part 61B uses the second magnification that is higher than the first magnification as the magnification, so that erroneous determination in the case where the thickness of the recording media P is the second thickness is suppressed as compared with the mode C.

In the present embodiment, the photographing range of the photographing part 72 is a range in which images of all the recording media P in the floating state among the plurality of recording media P loaded on the loading part 22 can be captured. For this reason, since it is possible to determine whether or not a medium bundle is present among all the recording media P in the floating state, erroneous determination is suppressed as compared with a case where the photographing range of the photographing part 72 is a range in which an image of a part of the recording media P in the floating state can be imaged.

Further, in the present embodiment, while the feeding operation of the recording media P by the feeding unit 40 is continued, the photographing part 72 continues the photographing operation in the photographing range. For this reason, since it is possible to determine whether or not a medium bundle is present while the feeding unit 40 is continuously performing the feeding operation of the recording media P, erroneous determination is suppressed as compared with a case where the photographing part 72 stops the photographing operation in the photographing range when the feeding unit 40 is continuously performing the feeding operation of the recording media P.

In the present embodiment, the photographing part 72 continuously captures images of the recording media P a plurality of times. The determination part 61B changes the number of times of determination per unit time on the basis of a type of the recording medium P. Therefore, as compared with a case where the number of times of determination per unit time by the determination part 61B is constant regardless of a type of the recording medium P, the variation in the determination accuracy due to a difference in type of the recording medium P is suppressed.

Specifically, in the present embodiment, when the recording media P have the first thickness, the determination part 61B determines whether or not a medium bundle is present at the first number of times of determination predetermined per unit time (e.g., 30 times per second), and when the recording media P have the second thickness smaller than the first thickness, the determination part determines whether or not a medium bundle is present at the second number of times of determination per unit time (e.g., 60 times per second) that is larger than the first number of times of determination.

Here, in the case where the thickness of the recording media P is the second thickness smaller than the first thickness, since an attitude of the recording medium P is easily changed by being inclined or waved due to supply of air from the supply unit 30 as compared with the case where the thickness of the recording media P is the first thickness, an image having a thickness larger than an actual thickness may be obtained. Therefore, in a case where when the thickness of the recording media P is the second thickness, whether or not a medium bundle is present is determined at the first number of times of determination per unit time (hereinafter referred to as a mode D), erroneous determination may occur.

By contrast, since in the present embodiment, as described above, the determination part 61B determines whether or not the medium bundle is present at the second number of times of determination per unit time, which is larger than the first number of times of determination, when the thickness of the recording media P is the second thickness smaller than the first thickness, erroneous determination in a case where the thickness of the recording media P is the second thickness is suppressed as compared with the mode D.

Further, in the present embodiment, the position detection part 61C detects a position of a medium bundle when the medium bundle is present. Therefore, in a case where a medium bundle is present, information about the position of the medium bundle is obtained.

This enables setting of a condition related to the feeding operation of the feeding unit 40 on the basis of a position of a medium bundle in the present embodiment, so that it is easy to set a condition related to the feeding operation of the feeding unit 40 to a condition enabling suppression of multi-feeding. As a result, according to the feeding device 12 of the present embodiment, multi-feeding of the recording media P can be easily suppressed as compared with a case of detecting only whether or not a medium bundle is present among the plurality of recording media P in the floating state.

Specifically, in the present embodiment, when the determination part 61B determines that the medium bundle is present, the position detection part 61C detects, as the position of the medium bundle, the distance LA (refer to FIG. 6) between the position where the feeding unit 40 comes into contact with the recording medium P (specifically, the lower surface 42B of the sucking body 42) and the medium bundle. Therefore, information about a distance between the position at which the feeding unit 40 comes into contact with the recording medium P and the medium bundle is obtained as information about the position of the medium bundle.

In the present embodiment, this enables setting of a condition related to the feeding operation of the feeding unit 40 on the basis of the distance between the position at which the feeding unit 40 comes into contact with the recording medium P and the medium bundle, so that it is easy to set a condition related to the feeding operation of the feeding unit 40 to a condition enabling suppression of multi-feeding. As a result, according to the feeding device 12 of the present embodiment, multi-feeding of the recording media P can be easily suppressed as compared with a case of detecting only a position not related to the distance.

Further, in the present embodiment, the position detection part 61C continuously detects a position of a medium bundle when the medium bundle is present. When the bundling state of the medium bundle is cancelled, the determination part 61B determines that no medium bundle of the media is present thereafter.

Therefore, when that the bundling state of the medium bundle is cancelled, erroneous determination is suppressed thereafter as compared with the case where the determination part 61B can determine that a bundle of the recording media P is present. Here, when the bundling state of the medium bundle is cancelled, the recording medium P is unlikely to be brought into the bundling state again. Therefore, in the present embodiment, the above-described configuration is employed with priority given to suppression of erroneous determination.

Further, in the present embodiment, the change part 61D changes a condition related to the feeding operation of the feeding unit 40 on the basis of information on whether or not the medium bundle determined by the determination part 61B is present.

Therefore, as compared with a case where a condition related to the feeding operation of the feeding unit 40 is constantly maintained, a feeding failure of the recording medium P is suppressed.

First Modification of Acquisition Part 61A

Although in the present embodiment, the acquisition part 61A acquires the thickness information per unit number of the recording media P associated with the input information input by the user or the thickness information per unit number of the recording media P input by the user, the present invention is not limited thereto.

Figure 9:
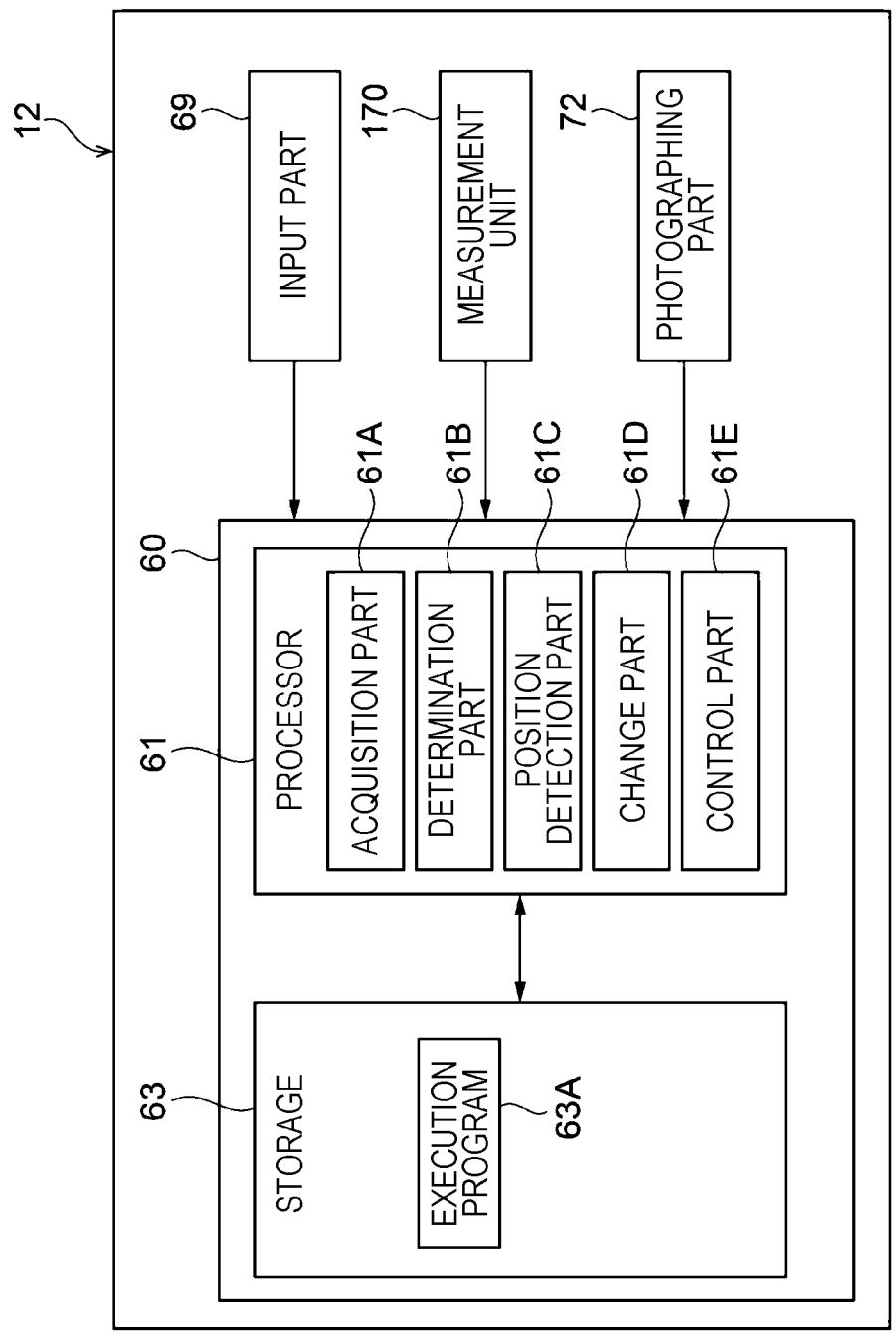
FIG. 9 is a block diagram illustrating an example of a feeding device according to a first modification.

In the first modification, as illustrated in FIG. 9, the feeding device 12 includes a measurement unit 170 that measures a thickness per unit number of the recording media P. The measurement unit 170 can be configured as a measurement device having a casing different from a casing of the image forming apparatus 10.

As a measurement method in the measurement unit 170, for example, the following method can be employed. Specifically, there is provided a method in which before the recording medium P is housed in the housing unit 20, one sheet of the recording medium P is photographed by a camera in advance to measure a thickness of one sheet of the recording medium P.

In addition, there is provided a method of measuring a thickness of one sheet of the recording medium P by a measuring device such as a step meter or a micrometer.

Alternatively, a thickness of a sheet of the recording medium P may be calculated by measuring a physical property value (e.g., bending stiffness, transmittance of ultrasonic waves, reflectance of ultrasonic pulses, light transmittance) highly correlated with the thickness of the recording medium P.

The measuring unit 170 may be a measurement unit that has a measurement device disposed inside the casing of the image forming apparatus 10 and measures the recording medium P transported by the transport part 14. In this case, it is detected whether or not a medium bundle is present among the recording media P fed from the feeding device 12 after the measured recording medium P.

In the first modification, the acquisition part 61A acquires a thicknesses measured by the measurement unit 170 as the thickness information. The determination part 61B determines whether or not a medium bundle is present on the basis of the thickness information acquired by the acquisition part 61A and a thickness of an image.

In the first modification, since it is not necessary for a user to check a type of the recording medium P and perform input operation of information on the type of the recording medium P, user's time and effort are reduced as compared with a case where input thickness information is used.

Second Modification of Acquisition Part 61A

In the second modification, the supply unit 30 executes first floating operation of floating the recording medium P in a state accompanied by execution of the feeding operation of the recording medium P by the feeding unit 40, and second floating operation of floating the recording medium P in a state not accompanied by execution of the feeding operation of the medium by the feeding unit 40, the second floating operation being executed before the first floating operation. In other words, the second floating operation is floating operation for floating the recording medium P as preliminary operation prior to the first floating operation.

In the second floating operation, the photographing part 72 captures images of the plurality of recording media P that are being floated by the supply unit 30.

In the second floating operation, the acquisition part 61A acquires the thickness information from the image captured by the photographing part 72. Specifically, the acquisition part 61A acquires, for example, information about a thickness of an image having the smallest thickness among the plurality of images captured by the photographing part 72 as the thickness information. Then, the determination part 61B determines whether or not a medium bundle is present on the basis of the thickness information acquired by the acquisition part 61A and a thickness of an image.

Therefore, according to the second modification, as compared with the case where a thickness measured by the measurement unit provided in the feeding device 12 is used as the thickness information, no measurement unit is necessary, and thus the configuration of the feeding device 12 can be simplified.

Further, in the second modification, since it is not necessary for a user to check a type of the recording medium P and perform input operation of information on the type of the recording medium P, user's time and effort are reduced as compared with the case where input thickness information is used.

Modification of Determination Part 61B

Although in the present embodiment, the determination part 61B determines whether a medium bundle is present or not on the basis of the thickness information per unit number of the recording media P and a thickness of an image (see the dimension DA in FIG. 6) captured by the photographing part 72, the present invention is not limited thereto.

In the present modification example, the determination part 61B determines that a medium bundle is present in a case where images having different thicknesses are present among images captured by the photographing part 72.

More specifically, the determination part 61B determines that a medium bundle is present when among the images captured by the photographing part 72, an image is present that is equal to or greater than a threshold with a thickness of an image having the smallest thickness as a reference. Specifically, a value obtained by multiplying the thickness of the image having the smallest thickness by a predetermined magnification is set as the threshold. Further, the determination part 61B updates the reference every time an image having the smallest thickness is photographed.

According to this modification, as compared with the case where a thickness measured by the measurement unit provided in the feeding device 12 is used as the thickness information, no measurement unit is necessary, and thus the configuration of the feeding device 12 can be simplified.

According to the present modification, since the user does not need to check a type of the recording medium P and perform input operation of the information, user's time and effort are reduced as compared with the case where input thickness information is used.

Further, in the present modification, specifically, since the determination part 61B determines that a medium bundle is present in the case where among the images captured by the photographing part 72, an image is present that has a thickness greater than or equal to a threshold with a thickness of an image having the smallest thickness as a reference, erroneous determination is suppressed as compared with the case where the determination part 61B determines that the medium bundle is present.

Further, in the present modification, since the determination part 61B updates the reference whenever an image having the smallest thickness is captured, even when an image having the smallest thickness is captured, erroneous determination is suppressed as compared with a case where the determination part 61B maintains the reference.

Another Modification

Although in the present embodiment, specifically, the determination part 61B determines that a medium bundle is present when the thickness of the image (see the dimension DA in FIG. 6) is greater than or equal to the threshold value obtained by multiplying, by a predetermined magnification, the thickness indicated by the thickness information acquired by the acquisition part 61A, and the magnification is different for each thickness of the loaded media P, the magnification is different, for example, for each thickness of the loaded recording medium P, the present invention is not limited thereto. For example, a magnification to be used may be constant regardless of a thickness of the recording media P.

In addition, although in the present embodiment, the photographing range of the photographing part 72 is a range in which images of all the recording media P in the floating state among the plurality of recording media P loaded on the loading part 22 can be captured, the present invention is not limited thereto. For example, the photographing range of the photographing part 72 may be a range in which an image of a part of the recording media P in the floating state can be captured.

Further, although in the present embodiment, while the feeding operation of the recording medium P by the feeding unit 40 is continued, the photographing part 72 continues the photographing operation in the photographing range, the present invention is not limited thereto. For example, when the feeding operation of the recording medium P by the feeding unit 40 is continued, the photographing part 72 may stop the photographing operation in the photographing range.

Although in the present embodiment, the photographing part 72 continuously captures an image of the recording medium P a plurality of times, and the determination part 61B changes the number of times of determination per unit time on the basis of a type of the recording medium P, the present invention is not limited thereto. For example, the number of times of determination per unit time by the determination part 61B may be constant regardless of a type of the recording medium P.

Further, although in the present embodiment, the position detection part 61C detects a position of a medium bundle when the medium bundle is present, the present invention is not limited thereto. For example, it may be configured to determine only whether or not a medium bundle is present by the determination part 61B in the detection unit 70.

In addition, although in the present embodiment, in the case where a medium bundle is present, the position detection part 61C continuously detects a position of the medium bundle, and when the bundling state of the medium bundle is cancelled, the determination part 61B determines that there is no medium bundle of the media thereafter, the present invention is not limited thereto. For example, the determination part 61B may be configured to be capable of determining that a bundle of the recording media P is present even when the bundling state of the medium bundle is cancelled.

The above-described processor 61 represents a processor in a broad sense, and is not limited to a general-purpose processor (e.g., the above-described CPU), and may be a dedicated processor (e.g., GPU: Graphics Processing Unit, ASIC: Application Specific Integrated Circuit, FPGA: Field Programmable Gate Array, programmable logic devices, or the like).

In addition, the operation of the processor in the present embodiment may be performed not only by one processor but also by cooperation of a plurality of processors present at physically separated positions. In addition, the order of the respective operations of the processor is not limited to the order described in the present embodiment, and may be appropriately changed.

Further, the feeding device 12 may be configured to change a condition related to the feeding operation of the feeding unit 40 on the basis of only the information on a thickness of an image regardless of detection (specifically, determination) of a medium bundle.

The present invention is not limited to the above-described embodiment, and various modifications, changes, and improvements can be made without departing from the gist of the present invention. For example, a plurality of the above-described modifications may be combined.

What is claimed is:

1. A feeding device comprising:
    a supply unit having an air blower, and being configured to supply air to a space between a plurality of loaded media to float the media;
    a feeding unit having a pair of feeding-out rollers, and being configured to feedout the media floated by the supply unit; and
    a detection unit having a camera, and being configured to detect whether or not a medium bundle is present among the plurality of media in a state of being floated by the supply unit,
    wherein the detection unit includes:
        the camera that captures images of the plurality of media and an image of the medium bundle in the state of being floated by the supply unit, wherein the plurality of media is loaded in an up-down direction of the feeding device; and
        a determination a part comprising a processor configured to determine whether or not the medium bundle is present on the basis of thickness information of the images of per unit number of the media and a thickness of the image of the medium bundle;
    wherein the processor is configured to determine that the medium bundle is present in a case where the thickness of the image of the medium bundle is greater than or equal to a threshold obtained by multiplying a thickness of the thickness information by a predetermined magnification, the magnification being different for each thickness of the media loaded.

2. The feeding device according to claim 1,
    wherein the processor is configured to:
    acquire the thickness information associated with input information input by a user or the thickness information input by the user, and
    determine whether or not the medium bundle is present on the basis of the thickness information acquired by the processor and the thickness of the image of the medium bundle.

3. The feeding device according to claim 1, further comprising:
    a measurement unit that measures a thickness per unit number of the media,
    wherein the processor is configured to:
    acquire the thickness measured by the measurement unit as the thickness information, and
    determine whether or not the medium bundle is present on the basis of the thickness information acquired by the processor and the thickness of the image of the medium bundle.

4. The feeding device according to claim 1,
    wherein the supply unit performs a first floating operation of causing the medium to float in a state where the feeding unit performs a feeding operation of the medium, and second floating operation of causing the medium to float in a state where the feeding unit does not perform the feeding operation of the medium, the second floating operation being performed before the first floating operation, the camera captures the images of the plurality of media in the state of being floated by the supply unit in the second floating operation, the processor is configured to:

acquire the thickness information from the images captured by the camera in the second floating operation, and determine whether or not the medium bundle is present on the basis of the thickness information acquired by the processor and the thickness of the image of the medium bundle.

5. The feeding device according to claim 1, wherein the processor is configured to:
use a first magnification as the magnification when the thickness of the media loaded is a first thickness, and
use a second magnification higher than the first magnification as the magnification when the thickness of the media loaded is a second thickness smaller than the first thickness.

6. The feeding device according to claim 1, wherein a photographing range of the camera is a range capable of capturing images of all media being floated among a plurality of media loaded.

7. The feeding device according to claim 6, wherein while a feeding operation of the media by the feeding unit is continued, the camera continues a photographing operation in the photographing range.

8. The feeding device according to claim 1, wherein the detection unit includes:
the camera that captures images of the plurality of media in the state of being floated by the supply unit, wherein the plurality of media is loaded in an up-down direction of the feeding device; and
the processor configured to determine that the medium bundle is present when an image of the medium bundle having different thickness is present among the images of the plurality of media captured by the camera.

9. The feeding device according to claim 8, wherein the processor is configured to determine that the medium bundle is present when among the images captured by the camera include an image with a thickness that is greater than or equal to a threshold that is based on, as a reference, a thickness of an image that is smallest in thickness.

10. The feeding device according to claim 9, wherein the processor is configured to update the reference every time an image having the smallest thickness is captured.

11. The feeding device according to claim 1, wherein the detection unit detects a position of the medium bundle when the medium bundle is present.

12. The feeding device according to claim 11, wherein when the medium bundle is present, the detection unit continuously detects the position of the medium bundle, and
when a bundling state of the medium bundle is cancelled, the detection unit thereafter determines that no medium bundle of the media is present.

13. The feeding device according to claim 1, further comprising a change part that changes a condition related to a feeding operation of the feeding unit on the basis of information on whether or not the medium bundle detected by the detection unit is present.

14. An image forming apparatus comprising: the feeding device according to claim 1; and an image forming part that forms an image on a medium fed from the feeding device.

15. A feeding device comprising:
a supply unit having an air blower, and being configured to supply air to a space between a plurality of loaded media to float the media;
a feeding unit having a pair of feeding-out rollers, and being configured to feedout the media floated by the supply unit; and
a detection unit having a camera, and being configured to detect whether or not a medium bundle is present among the plurality of media in a state of being floated by the supply unit,
wherein the detection unit includes:
the camera that captures images of the plurality of media and an image of the medium bundle in the state of being floated by the supply unit, wherein the plurality of media is loaded in an up-down direction of the feeding device; and
a determination part comprising a processor configured to determine whether or not the medium bundle is present on the basis of thickness information of the images of per unit number of the media and a thickness of the image of the medium bundle;
wherein the camera continuously captures the image a plurality of times, and the processor is configured to change the number of times of determination per unit time on the basis of a type of the medium.

16. The feeding device according to claim 15, wherein when the media have a first thickness, the processor is configured to determine whether or not the medium bundle is present at a first number of times of determination predetermined per unit time, and
when the media have a second thickness smaller than the first thickness, the processor is configured to determine whether or not the medium bundle is present at a second number of times of determination per unit time that is larger than the first number of times of determination.

17. A feeding device comprising:
a supply unit having an air blower, and being configured to supply air to a space between a plurality of loaded media to float the media;
a feeding unit having a pair of feeding-out rollers, and being configured to feedout the media floated by the supply unit; and
a detection unit having a camera, and being configured to detect whether or not a medium bundle is present among the plurality of media in a state of being floated by the supply unit,
wherein the detection unit includes:
the camera that captures images of the plurality of media and an image of the medium bundle in the state of being floated by the supply unit, wherein the plurality of media is loaded in an up-down direction of the feeding device; and
a determination part comprising a processor configured to determine whether or not the medium bundle is present on the basis of thickness information of the images of per unit number of the media and a thickness of the image of the medium bundle,
wherein the detection unit detects a position of the medium bundle when the medium bundle is present, wherein the detection unit detects a distance between a position where the feeding unit comes into contact with the medium and the medium bundle as the position of the medium bundle.

* * * * *